United States Patent [19]

Niebylski

[11] Patent Number: 5,009,961

[45] Date of Patent: Apr. 23, 1991

[54] PRECERAMIC COMPOSITIONS AND CERAMIC PRODUCTS

[75] Inventor: Leonard M. Niebylski, Birmingham, Mich.

[73] Assignee: Ethyl Corporation, Richmond, Va.

[21] Appl. No.: 374,063

[22] Filed: Jun. 30, 1989

[51] Int. Cl.$^5$ .............................................. B32B 9/04
[52] U.S. Cl. ..................................... 428/446; 501/92; 524/174; 524/176; 524/413; 524/431; 524/439; 524/442
[58] Field of Search ............... 524/439, 442, 174, 176, 524/413, 431; 501/92; 428/446

[56] References Cited

U.S. PATENT DOCUMENTS

| | | | |
|---|---|---|---|
| 4,397,828 | 8/1983 | Seyferth et al. | 423/344 |
| 4,482,669 | 11/1984 | Seyferth et al. | 524/442 |
| 4,645,807 | 2/1987 | Seyferth et al. | 524/474 |
| 4,650,837 | 3/1987 | Seyferth et al. | 525/478 |
| 4,659,850 | 4/1987 | Arai et al. | 556/409 |

*Primary Examiner*—Melvyn I. Marquis
*Attorney, Agent, or Firm*—Patricia J. Hogan

[57] ABSTRACT

Preceramic polymer dispersions which have particular utility in providing protective ceramic coatings on carbon/carbon composites, graphite, carbon fibers, and other normally oxidizable materials are prepared by dispersing about 0.25-2.0 parts by weight of silicon metal, about 0.25-2.0 parts by weight of silicon tetraboride, about 0.25-2.0 parts by weight of silicon hexaboride, and about 0-2 parts by weight of silicon carbide in the product obtained by dispersing about 0.1-1.0 part by weight of a Group IVA metal salt or an organometallic Group IVA metal compound in an organic solvent solution containing one part by weight of a polysilazane and, if desired, heating the Group IVA compound/polysilazane dispersion to convert it to a solution.

13 Claims, No Drawings

PRECERAMIC COMPOSITIONS AND CERAMIC PRODUCTS

FIELD OF INVENTION

This invention relates to ceramic materials derived from polysilazanes and more particularly to such materials which are useful in protecting substrates that are normally susceptible to oxidative deterioration.

BACKGROUND

It is known that many materials, such as carbon/carbon composites, carbon fibers, graphite, and certain metals, have properties which make them attractive for use in aerospace and other applications in which their susceptibility to oxidative deterioration at elevated temperatures is a serious disadvantage. It would be desirable to find a means of protecting those materials from oxidation at high temperatures, and it has been proposed to provide such protection with ceramic coatings. However, known ceramic coatings have proved to be inadequate.

As disclosed in U.S. Pat. Nos. 4,397,828 (Seyferth et al.-I), 4,482,669 (Seyferth et al.-II), 4,645,807 (Seyferth et al.-III), 4,650,837 (Seyferth et al.-IV), and 4,659,850 (Arai et al.), it is known that ceramics can be obtained from polysilazanes.

SUMMARY OF INVENTION

An object of this invention is to provide novel preceramic polymer compositions.

Another object is to provide such compositions which can be converted to ceramic coatings capable of protecting oxidizable substrates from oxidative deterioration at elevated temperatures.

These and other objects are attained by dispersing (A) a homogenized mixture of about 0.25–2.0 parts by weight of silicon metal, 0.25–2.0 parts by weight of silicon tetraboride, 0.25–2.0 parts by weight of silicon hexaboride, and 0–2 parts by weight of silicon carbide in (B) the product obtained by dispersing about 0.1–1.0 part by weight of a Group IVA metal salt or an organometallic Group IVA metal compound in an organic solvent solution containing one part by weight of a polysilazane and, if desired, heating the Group IVA compound/polysilazane dispersion to convert it to a solution.

Detailed Description

The polysilazane which is mixed with the metal salt may be any polysilazane that is soluble in common organic solvents, such as aliphatic or aromatic hydrocarbons, dialkyl or alicyclic ethers, etc.; and it may be, e.g., a polysilazane of Seyferth et al.-I, Seyferth et al.-II, Seyferth et al.-III, Seyferth et al.-IV, or Arai et al., the teachings of all of which are incorporated herein in toto by reference. However, it is preferably a polysilazane of the type taught by Seyferth et al.-II, i.e., a polysilazane prepared by reacting an organodihalosilane with ammonia, treating the ammonolysis product with a basic catalyst which is capable of deprotonating an NH group that is adjacent to an SiH group, and quenching the resultant product with an electrophilic quenching reagent, a mixture of such polysilazanes, or, alternatively, an oligomeric ammonolysis product formed as an intermediate in the process of Seyferth et al.-II and isolated as in Seyferth et al.-I. For example, it may be one or more polysilazanes prepared by reacting methyldichlorosilane with ammonia, treating the ammonolysis product with potassium hydride, and quenching the resultant product with methyl iodide or dimethylchlorosilane; or it may be one or more polysilazanes prepared by reacting methyldichlorosilane with ammonia and isolating the ammonolysis product.

The solvent employed for the polysilazane may be any suitable organic solvent, such as hexane, heptane, and other aliphatic hydrocarbons; benzene, toluene, xylene, and other aromatic hydrocarbons; cyclohexanone, 1-methyl-2-pyrrolidone, and other ketones; etc.; and mixtures thereof.

The Group IVA metal compound which is mixed with the polysilazane is a salt, such as a fluoride, oxide, oxyfluoride, oxynitride, acetate, benzoate, etc., or an organometallic compound of titanium, zirconium, or hafnium. When the Group IVA compound is an organometallic compound, it is preferably a cyclopentadienyl halide corresponding to the formula $(C_5H_5)_n MH_m X_p$ wherein M is a Group IVA metal, i.e., titanium, zirconium, or hafnium; X is halo, i.e., fluoro, chloro, bromo, or iodo; m is 0, 1, or 2; p and n are integers of 1–3; and $m+n+p=4$. Exemplary of such compounds are cyclopentadienylzirconium trichloride, bis(cyclopentadienyl)zirconium dichloride, tris(cyclopentadienyl)zirconium chloride, cyclopentadienylzirconium chloride dihydride, bis(cyclopentadienyl)zirconium chloride hydride, the corresponding titanium and hafnium compounds, the corresponding fluorides, bromides, and iodides, and mixtures thereof. The preferred compounds are the cyclopentadienylzirconium chlorides, especially bis(cyclopentadienyl)zirconium dichloride and bis(cyclopentadienyl)zirconium chloride hydride.

As indicated above, the dispersions of the invention may be heated to convert them to solutions if desired. It is believed that thermal treatment of the dispersions causes the Group IVA metal compound to react with the polysilazane, although it is possible that heating merely solubilizes the compound. When solution formation is desired, it is generally accomplished by heating the dispersion at a temperature in the range of about 100°–120°C. for a suitable time, e.g., about 4–16 hours.

The solids which are intimately mixed with the Group IVA metal/polysilazane dispersions or solutions to form the dispersions of the invention are constituted by about 0.25–2.0 parts by weight of silicon metal, about 0.25–2.0 parts by weight of silicon tetraboride, about 0.25–2.0 parts by weight of silicon hexaboride, and about 0–2 parts by weight of silicon carbide per part by weight of polysilazane employed in making the organometallosilazane polymer. The silicon carbide is preferably α-silicon carbide, the silicon metal is preferably amorphous, and the amounts of ingredients employed are preferably about 1.0 part by weight of the silicon metal, about 1.0 part by weight of the silicon tetraboride, about 0.5 part by weight of the silicon hexaboride, and about 0.5 part by weight of the silicon carbide per part by weight of the polysilazane.

In the preparation of the dispersions, it is preferred to premix the silicon metal, silicon tetraboride, silicon hexaboride, and silicon carbide, homogenize and dry them, and then intimately mix them with the organometallosilazane polymer solutions. Generally, the Group IVA metal/polysilazane dispersions or solutions are added to the homogenized solids, whether predispersed or not, and the resultant dispersions are agitated until they are uniform.

When the homogenized solids are predispersed in an organic medium, the amount of organic medium used is generally such that the ultimate dispersion has a total solids content of about 5-75% by weight, preferably about 30-60% by weight, if the dispersions are to be used as coating and/or infiltration materials.

The dispersions of the invention are preceramic materials which are useful for making ceramics such as coatings, structural composites, etc.; and, like other preceramic materials, they may be used in combination with other ingredients, such as ceramic powders or whiskers, etc., when appropriate.

An application in which they find particular utility is as coating compositions for normally oxidizable materials, especially those which need protection from oxidative deterioration at elevated temperatures. (Such materials include, e.g., fibers, tows, hanks, mats, and composites of carbon; carbon or graphite slabs, rods, and structures; and oxidizable metals, such as magnesium, aluminum, silicon, niobium, molybdenum, lanthanum, hafnium, tantalum, tungsten, titanium, and the metals of the lanthanide and actinide series.) When used in such an application in which the substrate is porous, the compositions also serve as infiltrants.

In addition to providing protection from oxidative deterioration, the coating compositions can also serve to improve the physical properties and thermal stability of substrates, such as those mentioned above, silica foams, ceramic cloths (e.g., cloths formed from alumina, silica, and/or lithia), etc.

The coating compositions are also useful for patching ceramic coatings formed from the same or different formulations.

When the dispersions are to be used to provide protective ceramic coatings on substrates, the surfaces to be coated are usually cleaned prior to the application of the coating composition in order to improve the bonding of the ceramic coating to the substrate. The bonding can sometimes be further improved by pre-etching the surfaces to be coated.

The coating compositions may be applied to the substrates in any suitable manner, such as by spraying, swabbing, or brushing, to form coatings having the desired thickness, generally a thickness of up to about 1000 micrometers, frequently a thickness of about 10-250 micrometers. A coating of a desired thickness can be achieved by applying a single coating of that thickness or by applying the precursor polymer coating composition in multiple thinner layers, e.g., by applying the coating composition in layers of about 25-100 micrometers, each layer being dried by driving off the solvent before the next layer is applied.

When temperatures as high as about 200°-250° C. are used to drive off high boiling solvents, some pyrolysis of the preceramic polymer is initiated during the drying of the coating composition. However, higher temperatures, i.e., about 675° C.-900° C., preferably about 825° C.-875° C., are required to convert the preceramic coating to a ceramic coating. This pyrolysis may be delayed until the final desired thickness of preceramic coating has been deposited. However, it is generally preferred to pyrolyze each one or two layers of dried preceramic coating before applying the next layer of coating composition. The time required for the pyrolysis is generally about 1-60 minutes, depending on the particular pyrolysis temperature selected. In the preferred embodiment of the invention where the coating is applied in multiple layers, each one or two of which is pyrolyzed before the application of the next layer, and the pyrolysis temperature is about 825°C.-875° C., it is generally preferred to pyrolyze the first coat for only about five minutes and then to pyrolyze subsequent coats for longer times up to about 15 minutes.

When the coating is intended to protect a substrate from oxidative deterioration at very high temperatures, e.g., temperatures higher than 800° C., the pyrolysis is followed by thermal treatment of the coated substrate at about 1075°C.-1250° C., preferably about 1100°C.-1175° C., most preferably about 1125° C., in an atmosphere containing not more than a minor amount of oxygen, e.g., in a nitrogen, argon, or helium atmosphere, to convert the ceramic coating into a homogeneous film. This treatment may be accomplished by raising the temperature in the vessel used for the pyrolysis or by transferring the coated substrate to a vessel maintained at the higher temperature; and it is preferably continued for about five minutes for the first coat and longer periods, e.g., about 15-20 minutes, for subsequent coats. The last coat is then heated at about 1225°C.-1300° C. for at least about five minutes.

After the pyrolysis or pyrolysis/heat treatment employed in providing a ceramic coating, the coated substrate is cooled. Optimum results are attained when this cooling is accomplished at a rate not greater than about 50° C./minute, preferably about 20°C.-30° C./minute, until the substrate temperature is below 500° C., at which time further cooling may be accomplished at ambient air temperature.

Although not essential, it is preferred to keep the starting polysilazane and the compositions formed from it in a dry atmosphere until a layer of ceramic has been formed because of the susceptibility of the preceramic materials to attack by water and other compounds having active hydrogens.

In a preferred embodiment of the invention, the substrate which is coated with a composition of the invention is a substrate which has been precoated with a dispersion of about 0.1-1.0 part by weight of a Group IVA compound (such as those disclosed above) in an organoborosilazane polymer solution obtained by reacting about 0.25-2.0 parts by weight of a trialkoxy-, triaryloxy-, or tri(arylalkoxy)boroxine with one part by weight of a polysilazane in an organic solvent or with a solution obtained by heating that dispersion.

The boroxine reactant used in preparing the organoborosilazane polymer is a compound corresponding to the formula:

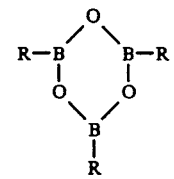

wherein R is an alkoxy, aryloxy, or arylalkoxy group, preferably an alkoxy, phenoxy, alkylphenoxy, phenalkoxy, or alkylphenalkoxy group in which any alkyl or alkoxy group contains 1-6 carbons, such as the trimethoxy-, triethoxy-, tripropoxy-, tributoxy-, tripentoxy-, trihexoxy-, triphenoxy-, tritolyloxy-, tri(2-ethylphenoxy)-, tribenzyloxy-, triphenethoxy-, tri(3-phenylpropoxy)-, tri(4-phenylbutoxy)-, tri(5-phenylpentoxy)-, and tri(6-phenylhexoxy)boroxines, the corresponding triphenalkoxyboroxines having non-linear alkyl chains, tritolylethoxyboroxine, etc. It is preferably trimethoxyboroxine or triphenoxyboroxine.

Regardless of the particular boroxine used, the amount employed is about 0.25-20 parts per part by weight of the polysilazane. However, when the boroxine is a trialkoxyboroxine, it is generally preferred to use about 1-6, most preferably about 3-4 parts per part by weight of polysilazane; and, when the boroxine is a triaryloxyboroxine, it is generally preferred to employ about 1-10, most preferably about 6-8 parts per part by weight of polysilazane.

To prepare the organoborosilazane polymers, the neat boroxine reactant (if sufficiently low melting) or a solution thereof in an organic solvent is added to a solution of a polysilazane in an organic solvent to initiate an exothermic reaction which is preferably controlled to a temperature below 50° C. for a period of time sufficient to allow the formation of an organoborosilazane polymer. In a preferred embodiment of the invention, the polysilazane is used as a clear solution having a solids content of about 10-40%, preferably about 20% by weight; and the total amount of solvent employed is such as to provide an organoborosilazane polymer solids content of about 5-75%, preferably about 40-60% by weight.

The solvent employed for the polysilazane and optionally also the boroxine may be any suitable organic solvent, such as hexane, heptane, and other aliphatic hydrocarbons; benzene, toluene, xylene, and other aromatic hydrocarbons; cyclohexanone, 1-methyl-2-pyrrolidone, and other ketones; etc.; and mixtures thereof.

When the substrate is precoated with the boron-containing composition, that composition is applied, dried, pyrolyzed, and, if desired, subjected to a subsequent heat treatment in essentially the manner described above for preparing ceramic coatings from the compositions of the invention.

An advantage of this preferred embodiment of the invention is that the undercoat and topcoat act synergistically to provide better protection from oxidative deterioration than can be achieved with either coat alone.

As already indicated, dispersions of the invention are useful in preparing a variety of ceramic objects, but the major advantage of the invention is its provision of compositions capable of protecting normally oxidizable materials from oxidative deterioration at elevated temperatures. This advantage is of particular importance in the protection of carbon/carbon composites, graphite, and metals used in aerospace applications, such as engine components, advanced nozzle system components, and high-temperature vehicle structures.

The following examples are given to illustrate the invention and are not intended as a limitation thereof.

EXAMPLE I

Synthesis of Polysilazane

Part A

A suitable reaction vessel was charged with 14 L of anhydrous tetrahydrofuran and cooled to about 0° C., after which 1545 g (13.43 mols) of methyldichlorosilane was added to the vessel, and stirring at about 60 rpm was begun. A slow steady stream of 1058 g (62.12 mols) of anhydrous ammonia gas was introduced into the vessel at a flow rate such that the reaction pressure was maintained at or below 400 kPa, and the reaction temperature stayed in the range of 0° C.-10° C. Then the reaction mixture was stirred at 0° C. for about three hours, after which the coolant flow on the vessel was shut off, and the system was put under gentle nitrogen purge to allow the reaction mass to warm to room temperature and the majority of the excess ammonia to vent off. Then the reaction vessel was pressurized with sufficient nitrogen gas to pump the product mass through a bag filter assembly into a holding tank, where it was verified that the filtrate solution was free of particulates.

Part B

The clear filtrate from Part A was discharged into a polymerization vessel and chilled to about 0° C., and a suspension of 3.6 g (0.089 mol) of potassium hydride powder in about 100 mL of anhydrous tetrahydrofuran was added to begin the polymerization reaction. The reaction mixture was maintained at 0° C. for about 8 hours and then allowed to warm gradually to about 22° C. After a total of about 26 hours of polymerization at 0° C.-22° C., the reaction was quenched by adding about 12.6 g (0.13 mol) of dimethylchlorosilane to the polymerization solution.

The polymer product was isolated by (1) concentrating the product solution to about 4 L of volume by vacuum distillation, (2) centrifuging the concentrated solution to obtain a clear supernatant solution and a white precipitate, (3) decanting off the supernatant solution from the precipitate, and (4) flashing off the volatiles from the supernatant solution by vacuum distillation to provide a white solid. Proton NMR spectra of the polymer in deuterated chloroform solvent had resonances consistent with those reported in Seyferth et al.-II for polysilazane and with the presence of a small amount, i.e., 2.4% by weight, of residual tetrahydrofuran.

EXAMPLE II

Synthesis of B-Containing Compositions

Part A

A clear solution of four parts by weight of trimethoxyboroxine in a mixture of 0.5 part by weight of xylene and 0.5 part by weight of 1-methyl-2-pyrrolidone was slowly added to a clear solution of one part by weight of the polysilazane of Example I in a mixture of 1.5 parts by weight of xylene and 1.5 parts by weight of 1-methyl-2-pyrrolidone. An exothermic reaction occurred to form a solution of an organoborosilazane polymer. The solution was designated Composition A.

Part B

Five grams (5 g) of bis(cyclopentadienyl)zirconium dichloride was dispersed in 100 g of Composition A, and the resulting composition was stirred continuously while being heated overnight at 110° C. to dissolve a portion of the zirconium compound. The composition so obtained was designated Composition B.

EXAMPLE III

Preparation of Novel Dispersion

Part A

Five grams (5 g) of bis(cyclopentadienyl)zirconium dichloride was dispersed in a 55% solution of the polysilazane of Example I in a 50:50 mixture of xylene and 1-methyl-2-pyrrolidone, and the resulting composition was stirred continuously while being heated overnight at 110° C. to dissolve a portion of the zirconium compound. The composition so obtained was designated Composition C.

Part B

A mixture of one part by weight of silicon tetraboride, 0.5 part by weight of α-silicon carbide, 0.5 part by weight of silicon hexaboride, and one part by weight of amorphous silicon metal was homogenized and vacuum-dried for at least two hours, after which Composition C was added in an amount of provide one part by weight of polysilazane, and the ingredients were intimately mixed to form a dispersion. The dispersion was designated Composition D.

EXAMPLE IV

Inhibited carbon/carbon composite coupons (i.e., carbon/carbon composite coupons containing an oxidation inhibitor) having nominal dimensions of about 2.5 cm×2.5 cm×0.34 cm were abraded to provided a smooth finish, cleaned, vacuum dried, thoroughly swab-coated in an inert atmosphere with Composition B, dried, heated at 100° C. for five minutes, heated to 150° C. at a rate of about 10° C./minute, held at 150° C. for 15-30 minutes, allowed to cool to room temperature, recoated and held at 150° C. for 30 minutes, heated to about 200°C.-225° C., maintained at that temperature for at least 15 minutes, and cooled to provide coupons having a coating thickness of about 0.08-0.1 mm.

The polymer coatings were then pyrolyzed to ceramic coats by heating the coated coupons to 800° C.-825° C., holding at that temperature for 30 minutes, and cooling to room temperature at a rate of 10°-20° C./minute.

The effectiveness of the ceramic coats thus obtained in protecting the carbon/carbon substrate from oxidation was determined by an oxidation test. The coated specimen was mounted horizontally in a half section of a silicon carbide tube which was used as a holder and which allowed over 99% of the coupon surface to be directly exposed to hot ambient convecting air. The holder and specimen were placed in a box furnace which had been preheated to 1400° C. Periodically the holder and specimen were removed from the furnace and quenched in ambient air, the cooled specimen was weighed and remounted in its holder, and the holder and specimen were replaced in the heated furnace for additional heating in air. The weight loss on oxidation was determined to be 79% after four hours.

EXAMPLE V

Example IV was essentially repeated except that, before being subjected to the oxidation test, the ceramic-coated coupons were coated with the Composition D dispersion, and the topcoats were dried and pyrolyzed in the same manner as the undercoats, then heated at 1100°C.-1150° C. for 5-15 minutes, and finally heated at 1225°-1300° C. for at least five minutes after the last coat had been applied. The weight loss on oxidation was determined to be only 1.2% after four hours.

It is obvious that many variations may be made in the products and processes set forth above without departing from the spirit and scope of this invention.

What is claimed is:

1. A dispersion of about 0.25-2.0 parts by weight of silicon metal, about 0.25-2.0 parts weight of silicon tetraboride, about 0.25-2.0 parts by weight of silicon hexaboride, and about 0.2 parts by weight of silicon carbide in the product obtained by intimately dispersing about 0.1-1.0 part by weight of a Group IVA compound selected from salts and organometallic compounds of Group IVA metals in an organic solvent solution containing one part by weight of a polysilazane.

2. The dispersion of claim 1 wherein the silicon carbide is α-silicon carbide.

3. The dispersion of claim 1 wherein the silicon metal is amorphous.

4. The dispersion of claim 1 wherein the Group IVA compound is a fluoride, oxide, oxyfluoride, or oxynitride salt.

5. The dispersion of claim 1 wherein the metal compound is a cyclopentadienyl halide corresponding to the formula $(C_5H_5)_nMH_mX_p$ wherein M is a Group IVA metal; X is halo; m is 0, 1, or 2; p and n are integers of 1-3; and $m+n+p=4$.

6. The dispersion of claim 5 wherein the cyclopentadienyl halide is bis(cyclopentadienyl)zirconium dichloride.

7. The dispersion of claim 1 wherein the polysilazane is a polymer prepared by reacting an organodihalosilane, with ammonia, treating the ammonolysis product by deprotonation with a basic catalyst which is capable of deprotonating an NH group that is adjacent to an SiH group, and quenching the resultant product with an electrophilic quenching reagent.

8. The dispersion of claim 7 wherein the organodihalosilane is methyldichlorosilane and the basic catalyst is potassium hydride.

9. The dispersion of claim 1 wherein the composition obtained by dispersing the metal compound in the polymer solution is heated at about 100°-120° C. until at least a portion of the metal compound has been solubilized.

10. An article which comprises a substrate that is normally susceptible to oxidative deterioration and a coating derived from the dispersion of claim 1.

11. A ceramic derived from the dispersion of claim 1.

12. An article which comprises a substrate that is normally susceptible to oxidative deterioration and a coating derived from the dispersion of claim 9.

13. A ceramic derived from the dispersion of claim 9.

* * * * *